June 23, 1959     W. F. GRATTAN     2,891,421
AUTOMATIC TRANSMISSION FOR AUTOMOTIVE VEHICLES
Filed Feb. 27, 1956     5 Sheets-Sheet 1
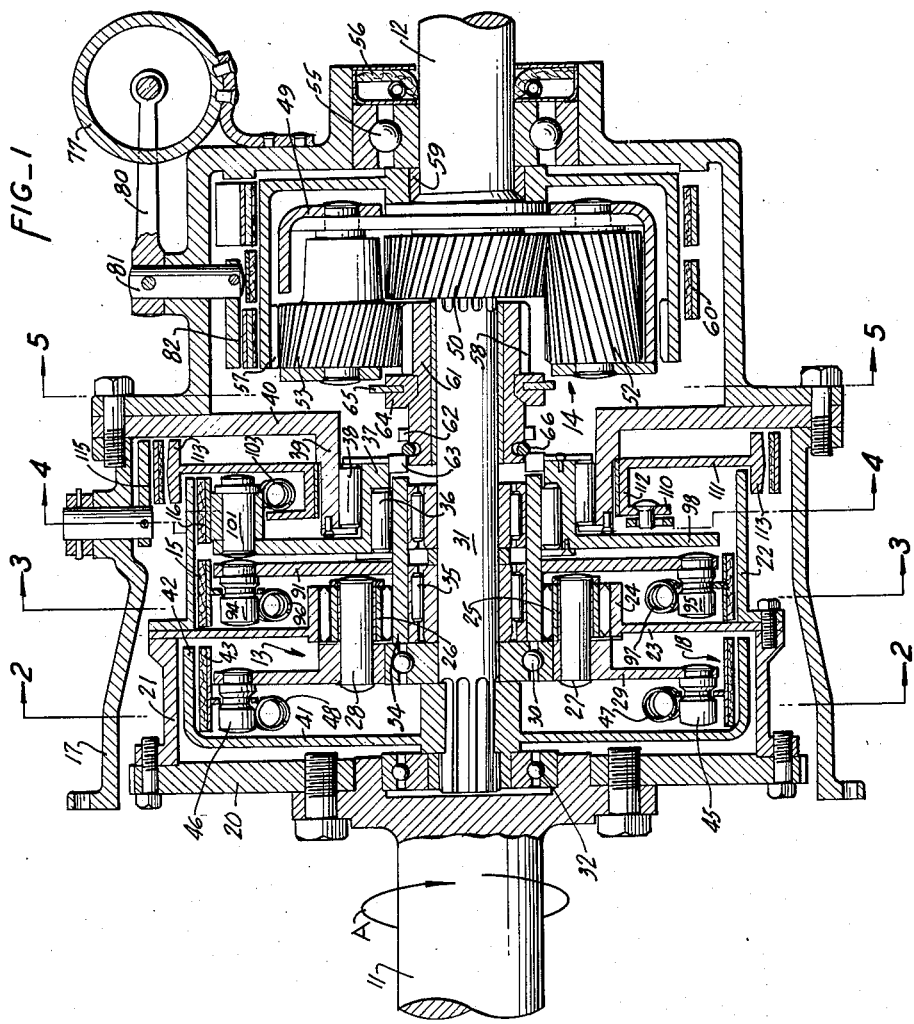
INVENTOR.
WORTHIN F. GRATTAN
BY
*Paul B. File*
PATENT AGENT

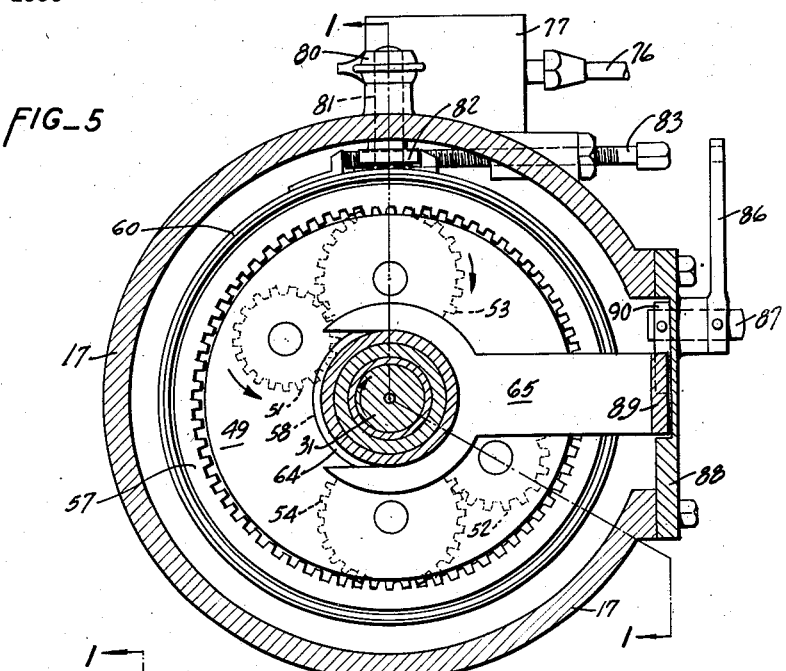
FIG_5
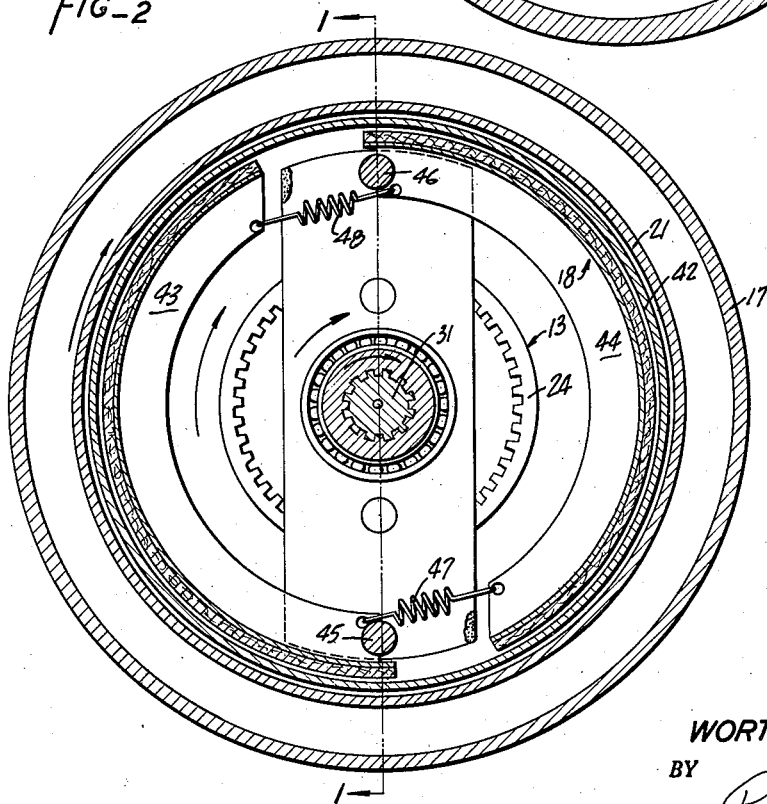
FIG_2
INVENTOR.
WORTHIN F. GRATTAN
BY
*Paul B. Fike*
PATENT AGENT

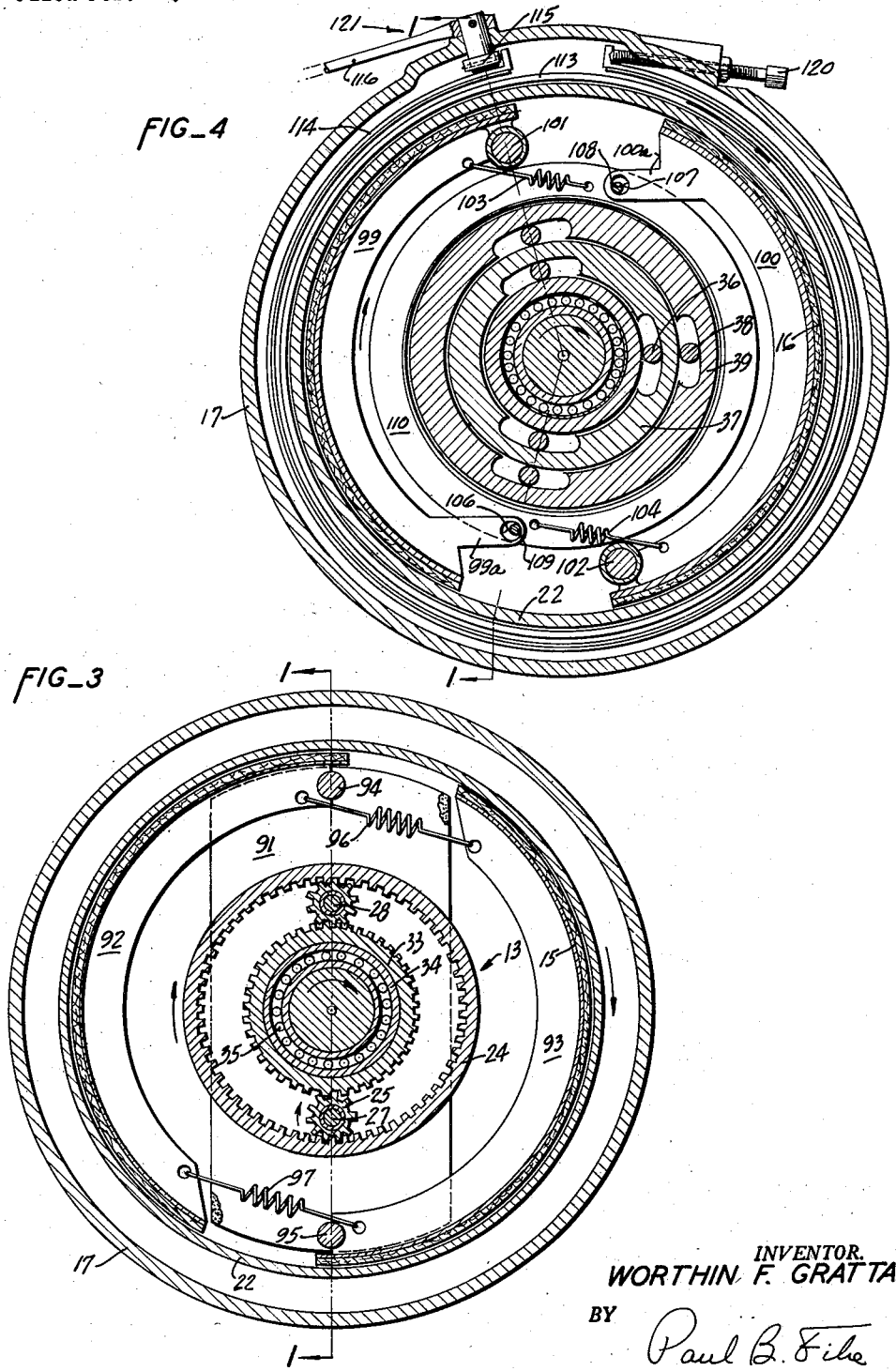

June 23, 1959     W. F. GRATTAN     2,891,421
AUTOMATIC TRANSMISSION FOR AUTOMOTIVE VEHICLES
Filed Feb. 27, 1956                    5 Sheets-Sheet 4
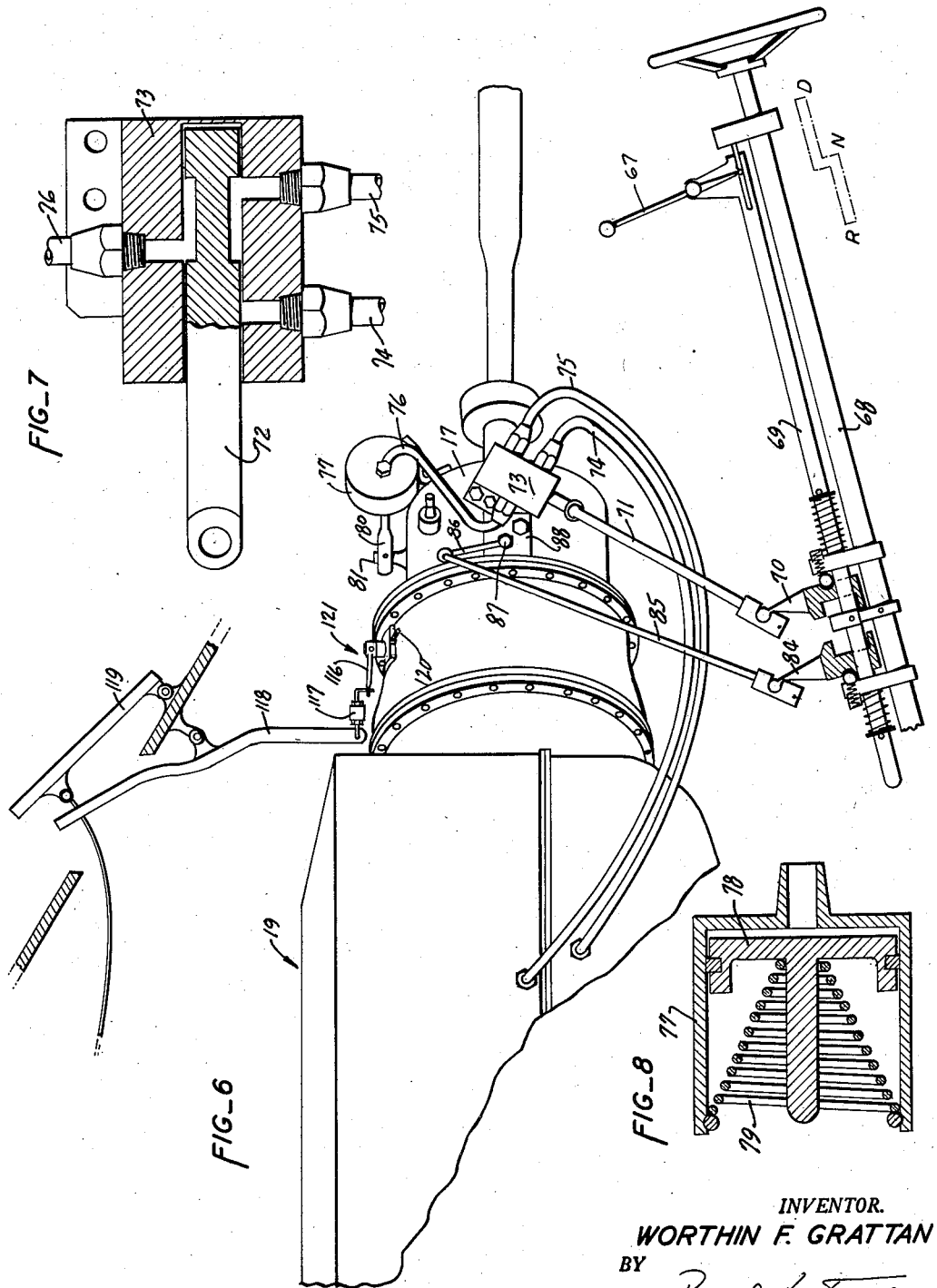
INVENTOR.
WORTHIN F. GRATTAN
BY
*Paul B. File*
PATENT AGENT June 23, 1959     W. F. GRATTAN     2,891,421
AUTOMATIC TRANSMISSION FOR AUTOMOTIVE VEHICLES
Filed Feb. 27, 1956     5 Sheets-Sheet 5
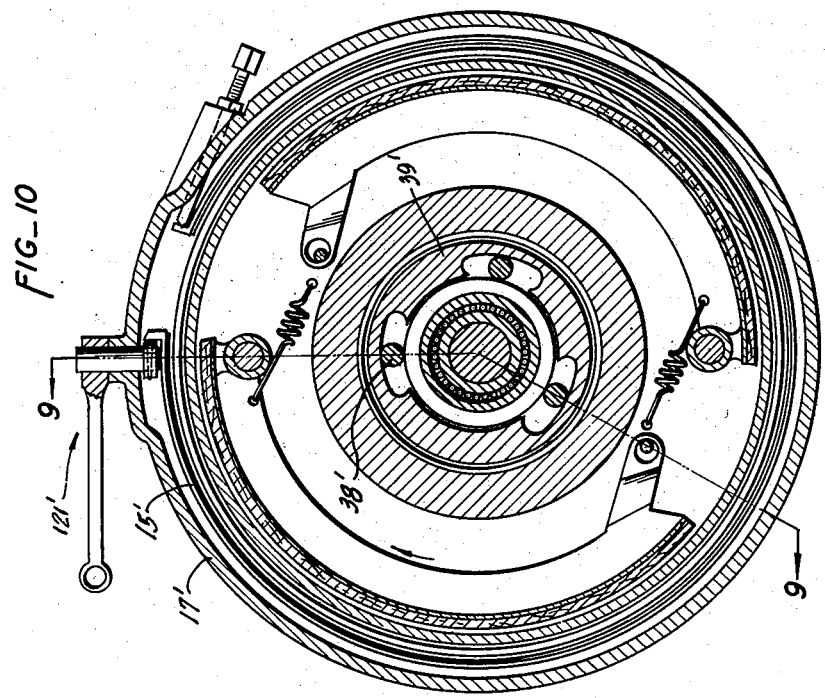
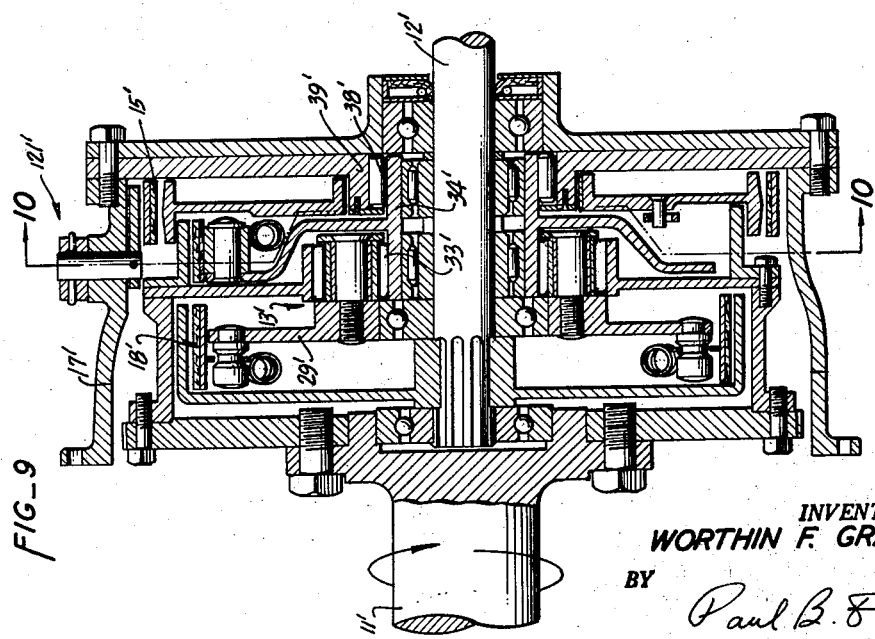
INVENTOR.
WORTHIN F. GRATTAN
BY
PATENT AGENT United States Patent Office 2,891,421
Patented June 23, 1959

2,891,421

AUTOMATIC TRANSMISSION FOR AUTOMOTIVE VEHICLES

Worthin F. Grattan, Los Gatos, Calif.

Application February 27, 1956, Serial No. 568,073

7 Claims. (Cl. 74—752)

The present invention relates to automatic transmissions and more particularly to automatic transmissions for automotive vehicles including automobiles, motorcycles and motor scooters.

It is an object of the present invention to provide an automatic transmission which, when incorporated in a motor vehicle, simplifies vehicle operation; but at the same time, gives the operator positive control of the speed and acceleration of the vehicle.

A further object of the invention is to provide an automatic transmission that enables the application of high torque to the driving wheels of the vehicle to facilitate rapid starting, hill climbing, and passing of cars, while preserving the economy of operation.

It is another object of the invention to provide an automatic transmission that includes one or more planetary gear trains and automatic clutches that are arranged to enable the transmission of power from a driving to a driven shaft through different paths as selected by the vehicle operator.

An additional object is to provide a simple automatic transmission embodying an improved control arrangement whereby the selection of the power transmission path is facilitated.

It is a further object of the invention to provide an automatic transmission of a fully mechanical nature whereby slippage and consequent inefficiency are avoided.

Another object of the invention is to provide an automatic transmission unit one or more of which, each embodying the invention, can be incorporated in a complete transmission to meet the power requirements of the particular vehicle.

Yet a further object is to provide an automatic transmission which, although effective in operation, is of relatively inexpensive construction and can moreover be easily installed and serviced by an ordinary mechanic.

These and other objects of the invention, as well as advantages derived from them, will become more apparent as the following description and accompanying drawings are disclosed.

Fig. 1 is a longitudinal sectional view of an automatic transmission embodying the present invention, partly taken along line 1—1 in each of Figs. 2, 3, 4, and 5, Fig. 2 is a transverse sectional view taken along line 2—2 in Fig. 1, Fig. 3 is a second transverse sectional view taken along line 3—3 in Fig. 1, Fig. 4 is a third transverse sectional view taken along line 4—4 in Fig. 1, Fig. 5 is yet another transverse sectional view taken along line 5—5 in Fig. 1, Fig. 6 is a perspective view of the automatic transmission and the controls therefor, as required for motor vehicle operation, Fig. 7 is a fragmentary sectional view of a control valve, Fig. 8 is a longitudinal sectional view of another control element, Fig. 9 is a longitudinal sectional view, similar to Fig. 1 of a modified and somewhat simplified transmission embodying the invention, partly taken along line 9—9 in Fig. 10 and, Fig. 10 is a transverse sectional view taken along line 10—10 in Fig. 9.

With initial reference to Fig. 1, the transmission there shown is particularly applicable to an automobile where a plurality of torque ratios are required to produce efficient and safe operation of the vehicle. As shown, the transmission is arranged to establish driving relationship between a drive shaft 11, such as the crankshaft of the automobile, and a driven shaft 12, the two shafts being axially aligned. To obtain torque multiplication, as required for example in the initial acceleration of the vehicle, the transmission includes two planetary gear trains, generally indicated at 13 and 14. Through subsequent actuation, automatic in nature, of centrifugal clutches 15 and 16, one or both of said gear trains can in effect be by-passed to lessen the amount of torque multiplication. In fact, when both clutches 15, 16 are engaged and the gear trains 13, 14 by-passed in the manner to be explained hereinafter, a direct drive is established between the drive and driven shafts 11 and 12.

More particularly, and with continued reference to Fig. 1 as well as Fig. 3, the drive shaft 11 is arranged to supply the input rotary power to the first planetary gear train 13. For this purpose, the end of the driving shaft 11 is bolted to an annular disc or fly-wheel 20 that is disposed within one end of the stepped, cylindrical housing 17 for the transmission. A short cylindrical tube 21 is bolted at its one end adjacent the outer edge of the fly-wheel 20 and has attached at its remote end two elements, one being a cylindrical extension 22 whose purpose will be made known hereinafter, the other attached element being an annular disc 23 whose inner periphery is formed into an internal ring gear 24 and constitutes one element of the first planetary gear train 13. Inside and geared to the internal ring gear 24 at diametrically opposite points are planetary gears 25, 26 supported in alignment and for individual rotation on spindles 27, 28 that are mounted on an annular partial disc 29 generally referred to as the planet carrier. The planet carrier 29 is mounted for free rotation on ball bearings 30 about a stub shaft 31 that is disposed axially between the drive and driven shafts 11 and 12 and is rotatable within supporting ball bearings as indicated at 32. This stub shaft 31 also supports a sun gear 33 concentrically within and meshing with the described planetary gears 25 and 26. This sun gear 33 forms an integral part of a sleeve 34 held in axial alignment for free rotation on the stub shaft 31 by roller bearings 35. Over the end of the sleeve 34, remote from the integral sun gear 33 (i.e. to the right as illustrated in Fig. 1) overrun rollers 36 are mounted for rotation in one direction only within a supporting cage 37 to be more fully described hereinafter. This cage 37 is in turn mounted for rotation in but a single direction through its support by additional overrun rollers 38 held in a second cage 39 having an extension 40 bolted to the previously mentioned stepped, cylindrical housing of the transmission.

When the drive shaft is caused to rotate in the direction indicated by the arrow A in Fig. 1, which shall hereinafter be referred to as the clockwise or forward direction, its rotative force will be transmitted through the fly-wheel 20 and cylindrical tube 21 to the described internal ring gear 24, this constituting the input to the first planetary gear train 13. This rotative force will in turn be transmitted from the ring gear 24 to the planetary gears 25 and 26 so that they will tend to rotate about the axes of their supporting spindles 27 and 28 in a clockwise direction. This rotation of the planetary gears 25, 26 will urge the central sun gear 33 in a counterclockwise direction. However, this sun gear 33 is part of the sleeve 34 which is held by the described overrun rollers 36 against counterclockwise or reverse rotation relative to the first cage 37 and this cage is in turn held against counterclockwise rotation relative to the second cage 39 affixed to the transmission housing 17. As a consequence, the sun gear 33 cannot move in a counterclockwise or reverse direction so that it constitutes the reactor element of the first planetary gear train, and the planetary gears 25, 26 walk therearound so that the planetary carrier 29 is constrained to move in the forward or clockwise direction. Because of the gear ratios designed into the unit, several turns of the drive shaft 11 are required to produce a single rotative cycle of the planetary carrier 29 whereby a torque multiplication is obtained through the gear train 13.

In accordance with the present invention, the torque multiplied in the described manner is arranged for transmission from the planetary carrier 29 to the stub shaft 31 upon attainment of a predetermined rotative speed. For this purpose, a centrifugal clutch, generally indicated at 18, is employed. As shown in Figs. 1 and 2, the centrifugal clutch 18 includes a cup-shaped element 41 centrally splined to the stub shaft 31 in a manner such that the side of the cup surrounds the described planetary carrier 29 to form a clutch drum 42. The movable element of the clutch 18 includes a pair of similar arcuate clutch shoes 43, 44 pivotally attached to pins 45, 46 fixed to the planetary carrier 29 adjacent its periphery and at diametrically opposite points (Fig. 2). Springs 47, 48 normally hold the clutch shoes 43, 44 out of engagement with the surrounding clutch drum 42 but upon attainment of a predetermined rotary speed, the force of the springs 47, 48 is overcome and the clutch shoes 43, 44 move outwardly into engagement with the clutch drum 42. In this manner, the rotative force or torque derived from rotation of the drive shaft 11 is, after its multiplication in the planetary gear train 13, supplied to the stub shaft 31.

The torque supplied to the stub shaft 31 as the output of the first planetary gear train 13 can be transmitted by this shaft to the second planetary gear train 14, so as to constitute the input thereto. With particular reference to Figs. 1 and 5, the second planetary gear train 14 includes a sun gear 50 splined to the right end of the stub shaft 31 as viewed in Fig. 1. The sun gear 50 meshes with planetary gears 51 and 52 supported for individual rotation on a planet carrier 49, at diametrically opposed points, as shown in Fig. 5. The planetary gears 51 and 52 are relatively long, so as to project beyond the sun gear 50 where they each mesh with a short planetary gear 53 or 54, supported circularly adjacent thereto on the aforementioned planet carrier 49. The planet carrier 49 is itself fixed to the driven shaft 12 to rotate therewith, and the end of the driven shaft 12 is supported within the end of the transmission housing 17 by ball bearings 55 and is encompassed by a suitable seal 56.

The rotation of this second planetary gear train 14 and the driven shaft 12 is controlled by concentrically arranged reactor gears 57 and 58, shown in Figs. 1 and 5, both of which mesh with the short planetary gears 53 and 54 but do not mesh with the longer planetary gears 51 and 52, which are smaller in diameter so as to pass freely between these concentric gears 57 and 58.

The outer reactor gear 57 constitutes a ring gear mounted by suitable bearings 59 for free rotation about the driven shaft 12 with its exterior surface arranged for engagement by a wrap-around brake band 60. Said brake band 60 can be shifted between ring gear engaging and non-engaging position by a mechanism, hereinafter described, to maintain said ring gear stationary or to permit the same free rotation. The inner reactor gear 58 is a sun gear formed at one end of a sleeve-like control element 61 that loosely surrounds the stub shaft 31 so that it can freely rotate thereabout and slide axially thereon. More particularly, this control element 61 is movable axially of the stub shaft 31 between two control positions. The rear position, as illustrated in Fig. 1 is such that radially projecting teeth 62 on the remote forward end of the control element 61, as viewed from the inner reactor gear 58, are disposed to the rear, and thus free from engagement with mating teeth 63 formed at the right end and inner arcuate portion of the previously mentioned overrun cage 37. To shift the control element 61 axially, whereby the teeth 62 and 63 are brought into meshing engagement, a collar 64 is provided around a central area of its outer surface, and is engaged by a shifting fork 65 (Fig 5) that is actuated by mechanism to be hereinafter described. When the control element 61 is moved from one selected position to another, a synchronizing spring 66, of known design, disposed adjacent the projecting teeth 62 provides for meshing of the mating teeth 63 without "clashing."

Both the brake band 60 and the control element 61 are actuated in an appropriate fashion by movement of a conventional shifting lever 67 supported on the steering post 68 of the vehicle as shown in Fig. 6. More particularly and in accordance with the present invention, predetermined movement of the shifting lever 67 operates through a linkage train 69, 70, 71 to displace a tubular valve member 72 within its housing 73 (Fig. 7). Suitable conduits 74, 75 connected respectively to the input and output side of the oil pump of the vehicle engine, indicated generally at 19, terminate in said housing 73 as also does a third conduit 76 which establishes hydraulic connection with a hydraulic servo motor 77 (Fig. 8). A piston 78 restrained by a compression spring 79 in such servo motor is connected through a lever 80 to a shaft 81 that passes through the transmission housing 17 in the vicinity of the second planetary gear train 14. Rotation of this shaft 81 actuates a cam 82 (see Fig. 5) which, depending upon the direction of motion, causes the brake band 60 to become engaged or disengaged with the exterior surface of the described ring gear 57. An adjustment screw 83 may be provided to control the extremes of movement of the brake band 60 when the cam 82 is actuated as described.

The shifting lever 67 is also arranged through a second linkage train 69, 84, 85, 86 to effect rotation of another shaft 87 that passes through a plate 88 attached to the side of the transmission housing 17. The rotation of this shaft 87 actuates movement of a slide bar 89 by way of a cam 90 (Fig. 5). This slide bar 89 is fixed to the shifting fork 65 which, as previously described, actuates axial movement of the described control element 61.

When the shifting lever 67 is in its neutral position, as indicated at "N" in the shifting diagram illustrated in Fig 6, the control element is in its free position, and the brake band 60 is out of engagement with the ring gear 57, such positions being those illustrated in Fig. 1. In this position, if the vehicle engine 19 is operating, the rotation of the drive shaft 11 is transmitted through the first planetary gear train 13 to effect rotation of the stub or intermediate shaft 31, once the centrifugal clutch 18 has been engaged. This rotation of the stub shaft 31 will in turn cause the rotation of the sun gear 50 at its remote end which motion will be transmitted through the planetary gears 51, 52, 53 and 54 to ultimately effect rotation of both the ring gear 57 and the control element 61. Since the latter are completely free to rotate, no reactive force is provided and no motion will be imparted to the driven shaft 12 through the planetary carrier 49 attached thereto. Since no power is transmitted to the driven shaft 12, the vehicle will remain stationary with the engine 19 idling.

If shifting lever 67 is now moved to reverse position, as indicated at "R" in the diagram of Fig. 6, the described linkage 69, 70, 71 will move the valve 72 to the left, as viewed in Fig. 7, to allow oil from the engine oil pump to pass through the conduit 75, valve housing 73, and thence through conduit 76 to the servo motor 77. The oil displaces the piston 78 in the servo motor against the restraining spring 79 to move the attached lever 80 so as to rotate the shaft 81 that passes through the transmission housing 17. This rotation of the shaft 81 actuates the cam 82 to press the brake band 60 into engagement with the exterior surface of the ring gear 57 to quickly stop rotation thereof. It should be emphasized that since the oil pump continuously operates, a continuous force is exerted by the brake band 60 against the ring gear 57 as long as the valve 72 remains in the described position. As previously described in connection with the neutral position, power will be transmitted through the first planetary gear train 13 and the intermediate shaft 31 to effect rotation of the sun gear 50 on the latter. Such rotation of the sun gear 50 in a clockwise or forward direction will effect counterclockwise rotation of the long planetary gears 51, 52 and, in turn, clockwise rotation of the short planetary gears 53, 54. Since the ring gear 57 that meshes with these short planetary gears 53, 54 is now held stationary by the brake band 60, these planetary gears 53, 54 will be constrained to walk in an epicyclic fashion around the ring gear 57 in a counterclockwise direction so as to cause the planetary carrier 49 and the driven shaft 12 attached thereto to rotate in a counterclockwise or reverse direction of rotation. The movement of the shifting lever 67 to the reverse position has no effect upon the position of the described control element 61 so that it will remain freely rotatable upon the stub shaft 31 and have no effect upon the reverse operation, as described.

If the shifting lever 67 is now returned to neutral position, the valve 72 closes the conduit 75 connected to the output of the engine oil pump and establishes communication between the servo motor 77 and the input or sump of the oil pump through the valve housing 73 and conduits 76 and 74. As a consequence, the piston 78 of the servo motor 77 is returned by the spring 79 to the position shown in Fig. 8 which withdraws the brake band 60 from engagement with the ring gear 57 of the secondary planetary gear train 14.

Continued movement of the shifting lever 67 to the drive position "D" diagrammatically illustrated in Fig. 6, effects no further motion of the valve 72, but does operate through the described second control linkage 69, 84, 85, 86 to effect axial sliding movement of the control element 61 to the left on the stub shaft 31 as viewed in Fig. 1 whereupon its teeth 62 are brought into mesh with the mating teeth 63 formed on the previously described extension of the overrun roller cage 37. As a consequence, the control element 61 is held against counterclockwise rotation. Now, when power is applied from the drive shaft 11 through the first planetary gear train 13 to the stub shaft 31 and the sun gear 50 fixed to its end, this sun gear 50 and the planetary gears 51, 52, 53 and 54, operatively connected thereto, will rotate individually in the directions described above and as illustrated in Fig. 5. However, since the control element 61 is held against rotation while the outer gear 57 is free to rotate, the short planetary gears 53, 54 will walk around the reactor sun gear 58 on the control element 61 in a clockwise or forward direction. Ultimately, the planetary carrier 49 and the attached driven shaft 12 will also rotate in a clockwise or forward direction.

It will be observed that in connection with either reverse or drive operation as described, torque multiplication will be obtained by the action of both the first and second planetary gear trains 13 and 14. While a high starting torque is, of course, desirable to instigate the forward motion of a vehicle, it is desireable also to reduce the amount of torque multiplication subsequent to the initial acceleration so that more economical vehicle operation may be obtained. To effect such economy, means are provided in accordance with the present invention to enable what is, in effect, a by-passing of one or both of said planetary gear trains 13, 14 so that ultimately a direct drive may be established between the drive and driven shafts 11 and 12. This is accomplished by establishing, in an automatic fashion, first, a direct mechanical connection between the drive shaft 11 and the reactor element, sun gear 33, of the first planetary gear train 13; and second, a direct connection between the drive shaft 11 and the reactor element, sun gear 58 on control element 61, of the second planetary gear train 14. The connections are made by the previously mentioned centrifugal clutches 15 and 16 that are adapted to engage automatically after attainment of predetermined conditions of vehicle speed and power.

As shown in Figs. 1 and 3, the first centrifugal clutch 15 that is employed in the by-passing of the first planetary gear train 13 includes a segmented disc 91 that is fixably attached midway on the sleeve 34 on whose extremity the reactor element, sun gear 33, for the first planetary gear train 13 is formed. Arcuate clutch shoes 92, 93 are pivotally supported on pins 94, 95 attached to the disc 91 adjacent its periphery, and are adapted to move outwardly into clutching engagement with the previously described cylindrical extension 22 of the tube 21 bolted to the flywheel 20 attached to the drive shaft 11. Springs 96, 97 are connected to the arcuate clutch shoes 92, 93 to maintain the same out of engagement with the described extension or clutch drum 22 until a predetermined rotative speed of the sleeve 34 in a clockwise direction, as viewed in Fig. 3, is obtained.

With reference to Figs. 1 and 4, the second centrifugal clutch 16 employed to by-pass the second planetary gear train 14 is formed in a manner generally similar to the above-described clutch 15. A segmented disc 98 is formed as an integral radial extension of the first overrun roller cage 37, and supports arcuate clutch shoes 99, 100 on pivot pins 101, 102 adjacent its periphery. These clutch shoes 99, 100 are urged inwardly by springs 103, 104, but upon attainment of a predetermined forward speed of the roller cage 37, they move outwardly into clutching engagement with the previously described extension or clutch drum 22.

Reverting now to the operation of the transmission when the shifting lever 67 is in drive position, it will be remembered that initially a high starting torque will be obtained through the torque multiplication provided by the first and second planetary gear trains 13 and 14. It will also be remembered that in such drive position, the control element 61 for the second planetary gear train 14 is moved to the left from its position illustrated in Fig. 1 so that the teeth 62 formed thereon are in mesh with the teeth 63 on the overrun roller cage 37 that supports the movable element of the second centrifugal clutch 16 described above. After a predetermined forward speed of the vehicle has been obtained, if the vehicle operator releases the accelerator pedal, a sudden decrease of input torque or power is experienced. Consequently, a reverse power flow through the transmission is obtained since the momentum of the vehicle causes the driven shaft 12 to now act as a drive element. When such reversal of power flow occurs, power transmitted from the driven shaft 12 through the second planetary gear train 14 causes the control element 61 of such train to revolve in a clockwise or forward direction. Since the control element 61 is connected to the overrun roller cage 37, and furthermore, since the sleeve 34 on which is formed the reactor element of the first planetary gear train 13, cannot rotate in a counterclockwise direction relative to such cage 37, both the cage 37 and the sleeve 34 move with the control element 61 in a clockwise or forward direction about the stub shaft 31. As a consequence, the clutch shoes 92, 93 and 99, 100 of both centrifugal clutches 15 and 16 attached respectively to the cage 37 and the sleeve 61 are caused to revolve and move outwardly against the action of their restraining springs 96, 97, 103 and 104 into engagement with the surrounding clutch drum 22. The springs 96, 97 of the first centrifugal clutch 15 are of lesser strength so that the clutch shoes 92, 93 thereof can establish engagement with the drum 22 at a lesser rotative speed. When the clutch shoes 92, 93 of the first centrifugal clutch 15 do engage the drum 22, a direct connection is established between the drive shaft 11 and the sleeve 34 so that the sun gear 33 formed on the sleeve and which constitutes the reactor element of the first planetary gear train 13 will revolve at the same speed as the ring gear 24 or drive element of such gear train whereupon the first planetary gear train 13 revolves as a unit and a one-to-one drive ratio is established between the drive shaft 11 and the stub or intermediate shaft 31. With the first planetary gear train 13 thus, in effect, by-passed, the driven shaft 12 is now rotated with lesser applied torque; torque multiplication being obtained only through the second planetary gear train 14.

Above a still higher vehicle speed, a release of the accelerator pedal will effect a reverse power flow much in the manner described above, but a higher rotative speed of the sleeve 34 and roller cage 37 will be attained so that the second centrifugal clutch 16 will also be engaged to establish connection between the drive shaft 11 and the reactor element of the second planetary gear train which, as will be remembered, constitutes the sun gear 58 formed at the end of the control element 61. Since this reactor element rotates with the drive shaft 11 and since the drive element of the second planetary gear train constituting sun gear 50 at the end of the intermediate shaft 31 is rotating at this same speed because the first planetary gear train 13 has been by-passed, the second planetary gear train 14 also is locked as a unit whereupon the driven shaft 12 is caused to revolve at the same speed as the drive shaft 11, and no torque multiplication is experienced through the transmission.

In certain cases, such as hill climbing, an operator may desire to temporarily re-establish a multiplication of torque between the drive and driven shaft 11 and 12. For this purpose, a release mechanism, generally indicated at 121, is provided to disengage arbitrarily the second centrifugal clutch 16 so as to provide an increased torque ratio between the drive and driven shafts 11 and 12. With particular reference to Figs. 1 and 4, the free end of each centrifugal clutch shoe 99 or 100 has an integral extension 99a or 100a with an opening 106 or 107 therethrough. Pins 108, 109 that project loosely into said openings 106, 107 are secured to the smaller of two parallel discs 110, 111 held in spaced relation by a generally cylindrical hub 112 that rotates about the stationary overrun roller cage 39 that is fixed to the housing 17 of the transmission. The larger disc 111 has an integral brake drum 113 on its periphery which drum is arranged for engagement by a wrap-around brake band 114. Such engagement is effected by movement of a cam 115 that is actuated by suitable linkage 116, 117, 118 connected to the accelerator pedal 119 of the vehicle as is shown in Fig. 6. When the accelerator pedal 119 is fully depressed, the brake band engages the brake drum 113 to stop the rotation of the discs 110, 111 and the pins 108, 109 thereon. As a result, the clutch shoes 99, 100 are withdrawn from engagement with the clutch drum 22 so as to re-establish the flow of power through the rear planetary gear train 14 and the multiplication of the torque resulting therefrom. To enable the proper adjustment of the described clutch-release mechanism 121, an adjustment screw 120 as shown in Fig. 4 is provided to control the movement of the brake band 114 in response to the depression of the accelerator pedal 119.

It will be apparent that after a high torque ratio has been re-established by the clutch-release mechanism 121 described above, subsequent release of the accelerator pedal 119 will effect the re-engagement of the second centrifugal clutch 16 and a resultant re-establishment of a one-to-one torque ratio.

It will be observed that the described transmission provides for reverse operation as well as forward operation of the vehicle with different torque ratios automatically established in accordance with the instantaneous driving condition, but simultaneously provides for the arbitrary change of such torque ratios at the will of the operator. The described arrangement meets well the needs for the effective and efficient transmission of power for an automobile; but it is contemplated, in accordance with the present invention, that other structures specifically different, yet embodying the same general principles can be constructed and employed to meet specific requirements of other types of vehicles.

With particular reference to Figs. 9 and 10, a second embodiment of the invention is disclosed wherein but two different torque ratios can be established for the forward movement of the vehicle and no reverse operation is obtainable. Such a transmission can be aptly employed for motor scooters and the like. While the transmission is simpler, many of its parts are similar or identical to those described hereinabove with respect to the first embodiment of the invention, and such similarity is indicated in the drawings by the employment of the same numerals, but with an added prime notation. More particularly, the transmission, as shown in Figs. 9 and 10 includes a planetary gear 13' train arranged substantially identically with the first planetary gear train 13 of the first embodiment of the invention so as to transmit power from a drive shaft 11' to a second shaft 12' which takes the position of the stub or intermediate shaft of the previously described transmission, but is actually, in the present embodiment, the driven shaft of the transmission. A centrifugal clutch 15' is arranged to provide for the lock up of this planetary gear train 13' to thus establish a direct drive between the drive and driven shafts 11' and 12' and a clutch-release mechanism 121' actuated in any suitable manner is adapted to enable the arbitrary release of the centrifugal clutch 15' and the consequent re-establishment of a higher torque ratio between the drive and driven shafts 11' and 12'.

In operation, after the vehicle engine is started to rotate the drive shaft 11', the rotary power is delivered to the planetary gear train 13' where the torque is multiplied in the manner described with respect to the first embodiment of the invention and is ultimately transferred from the planetary carrier 29' to the driven shaft 12' upon engagement of the centrifugal clutch 18' whose movable element is attached to such planetary carrier. After a predetermined vehicle speed has been attained, and the accelerator pedal (not shown) is released, a reverse power flow through the planetary gear train 13' will be experienced. This will cause the reactor sun gear 33' to rotate in the clockwise or forward direction (this sun gear 33' being prevented from rotation in the opposite direction by overrun rollers 38' in a cage 39' attached to the transmission housing 17'). The sleeve 34' on which the sun gear 33' is formed and the centrifugal clutch element attached thereto will also rotate forwardly to ultimately cause engagement of the clutch 15' and the lock-up of the planetary gear train 13' so that a direct drive is established between the drive and driven shafts 11' and 12'. Subsequent actuation of the release mechanism 121' will act in the manner described with respect to the first embodiment of the invention to disengage the clutch 15' and re-establish power flow through the planetary gear train 13' with a resultant increase in torque ratio between the drive and driven shafts 11' and 12'.

Various other alterations and modifications can obviously be made without departing from the spirit of the invention. Accordingly, the foregoing description is to be considered purely exemplary and not in a limiting sense, the actual scope of the invention being indicated by the appended claims.

What is claimed is:

1. An arrangement for transmitting rotary power from a drive shaft to a driven shaft which comprises an internal ring gear connected to the drive shaft, a reactor gear mounted within said ring gear for rotation in one direction only, a planetary gear meshing with said ring and reactor gears, a planetary carrier carrying said planetary gear and mounted for free rotation coaxially with said ring and reactor gears, and means operative to connect said planetary carrier to the driven shaft including a centrifugal clutch having a first element connected to the driven shaft and a second element mounted on said carrier for movement into engagement with said first element upon attainment of a predetermined rotative speed of said carrier.

2. An arangement for transmitting rotary power from a drive shaft to a driven shaft which comprises first and second planetary gear trains, each including a reactor element, means coupling the drive shaft to said first planetary gear train to drive the same, means coupling the output of said first planetary gear train to the second planetary gear train to drive the latter, means coupling the output of said second planetary gear train to the driven shaft, and means operative to couple the reactor elements of said gear trains to the drive shaft whereby said trains are each constrained to rotate as a unit wherefore a direct drive is established between the drive and driven shafts, and an arrangement for transmitting rotary power from a drive shaft to a driven shaft wherein said reactor element coupling means being automatically operative upon establishment of a reverse power flow from the driven shaft through said second planetary gear train.

3. An arrangement for transmitting rotary power from a drive shaft to a driven shaft which comprises first and second planetary gear trains, each including a reactor element, means coupling the drive shaft to said first planetary gear train to drive the same, means coupling the output of said first planetary gear train to said second planetary gear train to drive the latter, means coupling the output of said second planetary gear train to the driven shaft whereby the latter is driven, means operative to couple the drive shaft directly to the reactor element of said first planetary gear train whereby the latter rotates as a unit with the drive shaft, and means separately operative to couple the drive shaft to the reactor element of said planetary gear train whereby it rotates as a unit with the drive shaft, wherein each of said reactor-element coupling means are automatically operative upon establishment of a reverse power flow from the driven shaft though said second planetary gear train and upon attainment of predetermined rotative speeds of the driven shaft that differ for the two reactor-element coupling means.

4. An arrangement for transmitting power according to claim 3 comprising means operable to decouple the reactor element of said second planetary gear train from the drive shaft regardless of the speed and power condition then existing.

5. An arrangement for transmitting rotary power from a drive shaft to a driven shaft which comprises first and second planetary gear trains, each including a reactor element, means coupling the drive shaft to said first planetary gear train to drive the same, means coupling the output of said first planetary gear train to said second planetary gear train to drive the latter, means coupling the output of said second planetary gear train to the driven shaft whereby the latter is driven, means arranged to directly, connect the reactor element of said first planetary gear train to the drive shaft upon attainment of a predetermined speed of said reactor element, means operable to connect the reactor elements of said first and second planetary gear trains for rotation at the same speed and direction, said reactor element of said second planetary gear train being arranged to rotate in said direction upon establishment of a reverse power flow from the driven shaft to said second planetary gear train.

6. An arrangement for transmitting rotary power from a drive shaft to a driven shaft according to claim 5 wherein said means for directly connecting the reactor element to the drive shaft comprises a centrifugal clutch having a movable element mounted on said reactor element of said first planetary gear train.

7. An arrangement for transmitting rotary power from a drive shaft to a driven shaft according to claim 6 wherein said means for connecting said reactor elements permits faster rotation of the reactor element of said first planetary gear train than of the reactor element of said second planetary gear train in said direction.

References Cited in the file of this patent

UNITED STATES PATENTS

| | | |
|---|---|---|
| 782,547 | Coffee | Feb. 14, 1905 |
| 1,087,950 | Jones | Feb. 24, 1914 |
| 2,171,534 | Banker | Sept. 5, 1939 |
| 2,189,220 | Osborne | Feb. 6, 1940 |
| 2,229,654 | Hubbell | Jan. 28, 1941 |
| 2,598,179 | Kelbel | May 27, 1952 |
| 2,606,459 | Carnegie | Aug. 12, 1952 |
| 2,673,475 | Elsworth | Mar. 30, 1954 |
| 2,811,051 | Weymann | Oct. 29, 1957 |

FOREIGN PATENTS

| | | |
|---|---|---|
| 134,156 | Austria | July 10, 1933 |
| 691,705 | Great Britain | May 20, 1953 |
| 731,022 | Great Britain | June 1, 1955 |